United States Patent [19]

Witzel et al.

[11] 4,166,134
[45] Aug. 28, 1979

[54] METHOD FOR IMPROVING FLEXIBILITY RETENTION OF CHEWING GUM

[75] Inventors: Frank Witzel, Spring Valley; K. Warren Clark, Brewster, both of N.Y.; Abraham I. Bakal, Parsippany, N.J.

[73] Assignee: Life Savers, Inc., New York, N.Y.

[21] Appl. No.: 804,840

[22] Filed: Jun. 8, 1977

[51] Int. Cl.² .............................................. A23G 3/30
[52] U.S. Cl. ......................................... 426/3; 426/548
[58] Field of Search ..................................... 426/3-6, 426/548

[56] References Cited

U.S. PATENT DOCUMENTS

| | | | |
|---|---|---|---|
| 3,632,358 | 1/1972 | Echeandia | 426/3 |
| 3,973,041 | 8/1976 | Du Ross | 426/3 |
| 4,000,320 | 12/1976 | Klose | 426/3 |

*Primary Examiner*—Jeanette M. Hunter
*Attorney, Agent, or Firm*—Lawrence S. Levinson; Merle J. Smith; Burton Rodney

[57] ABSTRACT

A method is provided for improving flexibility retention of chewing gum which contains gum base, aqueous softener such as corn syrup, sucrose, and a humectant such as sorbitol includes separating the aqueous softener from the humectant by incorporating the aqueous softener in the gum base so as to provide a water-in-oil phase, admixing the sucrose with the water-in-oil phase, and admixing the humectant with the sucrose-water-in-oil phase combination to form a chewing gum. The resulting chewing gum includes the humectant in a water-soluble phase which is substantially isolated from the aqueous softener in the water-in-oil phase.

5 Claims, No Drawings

METHOD FOR IMPROVING FLEXIBILITY RETENTION OF CHEWING GUM

FIELD OF THE INVENTION

The present invention relates to a method for improving flexibility retention of chewing gum containing gum base, aqueous softener, sweetener, and a humectant, by preparing the chewing gum so that the aqueous softener is dispersed in the gum base to form a water-in-oil phase while the humectant is separated therefrom in a water-soluble phase, and to a chewing gum produced by such method.

BACKGROUND OF THE INVENTION

Chewing gums generally include gum base, water-soluble sweeteners and flavoring. The water-soluble sweeteners usually include sucrose, dextrose, corn syrup and/or sodium or calcium saccharin or combinations thereof. The chewing gum is generally prepared by melting the gum base, mixing corn syrup or liquid sweetener for 3 to 5 minutes with the gum base followed by the addition of solid sweetener (for example, sugar) and flavor and mixing for 5 minutes. The chewing gum is removed from the kettle, rolled and cut to the desired shape.

In the above chewing gum, the corn syrup (which provides a substantial portion of the moisture in the gum) will be retained in the gum base as part of the oil or insoluble phase and the sucrose and/or other sweeteners will be incorporated in a water-soluble phase which is in simple admixture with the oil phase and might even be considered to be coated on the gum base. The result is that the gum base will protect the corn syrup as an internal phase thereby minimizing the amount of corn syrup on the surface of the gum (surface corn syrup causes the gum to sweat). However, due to the equilibrium relative humidity of the chewing gum, eventual migration of moisture of the corn syrup to the gum surface and subsequent loss of moisture through evaporation is unavoidable at equilibrium relative humidities below that of the gum. Reduction in moisture content of chewing gum leads to loss of flexibility which manifests itself in increased stiffness and brittleness. The latter phenomena is, of course, associated with stale or old chewing gum.

In accordance with the present invention, it has now been found that where a humectant material, such as sorbitol, is included in the chewing gum after the corn syrup or other aqueous softener or moisturizer, and sweetener have been added to the gum base, (so that the aqueous softener and humectant material are substantially isolated from each other), the equilibrium relative humidity of the chewing gum will be lowered so that the chewing gum will tend to lose moisture at a substantially slower rate than conventional chewing gum. The result is that the chewing gum of the invention prepared with the humectant material will have enhanced flexibility retention as well as good sweat resistance since the humectant and corn syrup have been isolated from each other.

DESCRIPTION OF THE INVENTION

The method of the present invention for producing chewing gum having improved flexibility retention and good sweat resistance includes the steps of admixing melted gum base and an aqueous softener, such as corn syrup, to provide a water-in-oil phase, admixing sweetener with the water-in-oil phase, thereafter admixing one or more humectants, such as sorbitol, and other conventional chewing gum ingredients with the gum mass comprising the sweetener-water-oil phase combination, to form chewing gum. The chewing gum may then be rolled and cut into the desired shape.

It has been found that chewing gum prepared in the manner described above, wherein the aqueous softener is effectively separated from the humectant, when stored at room temperature and 50% relative humidity with no wrappers, such gums are still flexible after four weeks of storage, whereas chewing gums made in a conventional manner and stored under the same conditions lose their flexibility after two weeks of storage.

Furthermore, in accordance with the present invention, the chewing gum having improved flexibility retention and good sweat resistance produced by the above method is also provided. The chewing gum of the invention includes gum base, aqueous softener (such as corn syrup), sweetener, and a humectant, the aqueous softener being incorporated in the gum base to form a water-in-oil phase which minimizes the amount of surface corn syrup thereby inhibiting sweating and reducing moisture loss from the chewing gum, and the humectant being incorporated in a water-soluble phase (after the sweetener) so as to be effectively separated from the aqueous softener, and thereby lowering the equilibrium relative humidity of the chewing gum.

The term "flexibility" as employed herein is a measure of freshness or the ease at which chewing gum sticks may be bent. The definition is based on the observation that stale chewing gums break into pieces when bent.

In carrying out the method of the invention, the gum base is first melted; thereafter, the gum base is cooled to below 200° F., and preferably below 180° F. and the aqueous softener, such as corn syrup, is thoroughly mixed in the gum base to effect uniform distribution. Flavors and emulsifiers or softeners, such as lecithin, may then be added, if desired, and the mixture is mixed for from 1 to 2 minutes, and preferably for 2 minutes. At this stage, flavor oil is preferably added with mixing for from 2 to 5 minutes, preferably about 3 minutes. A particulate artificial or natural sweetener, such as sugar, free saccharin acid, sodium or calcium saccharin, cyclamate, aspartame, etc. is added to the continuous mass with mixing being continued for from 3 to 5 minutes, and preferably for from 2 to 4 minutes. The humectant is added to and mixed with the gum mass for from 1 to 5 minutes, and preferably for from 1 to 3 minutes. Thereafter, if desired, solid flavor such as gum arabic coated flavor may be added and mixed with the gum base mix to form a chewing gum which may be rolled, scored and cut into desired shapes.

It will thus be appreciated that the present invention provides a chewing gum and method for making the same wherein improved flexibility retention and good sweat resistance are obtained without the need for coating, encapsulating, and/or integrating water-insoluble polymeric substances such as polyvinyl esters on to the particles of sweetener and/or other flavoring agents.

The sweeteners suitable for use herein include artificial or natural non-sugar sweeteners such as saccharin salts, such as the sodium, calcium or ammonium saccharin salts, the free acid form of saccharin, dihydrochalcones (for example, neohesperidine dihydrochalcone), glycyrrhizin, glycyrrhizic acid ammonium salt, L- aspartyl-L-phenylalanine methyl ester, as well as *Stevia rebaudiana* (Stevioside), *Richardella dulcifica* (Miracle Berry), *Dioscoreophyllum cumminsii* (Serendipity Berry), and cyclamate salts, and the like, or mixtures of any two or more of the above, with the water-soluble sweeteners being preferred.

Where employed, the artificial or natural non-sugar sweetener will be present in the chewing gum in amounts ranging from about 0.05 to about 2.0% and preferably from about 0.1 to about 0.5%.

The chewing gum may contain a solid particulate water-soluble natural sweetener in an amount ranging from about 90 to about 0.05%, preferably from about 90 to about 40%, and more preferably from about 85 to about 70% by weight of the final product. Such solid particulate water-soluble sweeteners may include one or more sugars, sugar alcohols, or sugar containing material, for example, monosaccharides, disaccharides and polysaccharides, some examples of which follow:

A. Monosaccharides of 5 or 6 carbon atoms—arabinose, xylose, ribose, glucose, mannose, galactose, fructose, dextrose, or sorbose or mixtures of two or more of the foregoing monosaccharides.

B. Disaccharides—sucrose such as cane or beet sugar, lactose, maltose or cellobiose; and C. Polysaccharides—partially hydrolyzed starch, dextrin or corn syrup solids.

The humectants will preferably comprise a sugar alcohol, such as sorbitol, xylitol, maltitol or mannitol, and will be present in an amount within the range of from about 2 to about 50% and preferably from about 10 to about 20% by weight of the chewing gum product.

In a preferred embodiment, sorbitol will be included as the humectant, and a combination of sugar and saccharin will be employed as sweetener.

In each of the preferred embodiments of the chewing gum and method of the invention, corn syrup will be employed as the aqueous plasticizer or softener.

The softener or plasticizer includes any of the commercially available corn syrups of varying Dextrose Equivalents and Baumes and including the high maltose syrups. It does not include the isomerized syrups. The corn syrup will be present in a range of from about 5 to about 25% and preferably from about 10 to about 20% by weight of the final chewing gum.

Generally, in forming a preferred embodiment of the chewing gum of the invention, the aqueous softener sweetener will be employed in a weight ratio to humectant of within the range of from about 2.5 to about 1.25 and preferably within the range of from about 2 to about 1.3.

The chewing gum will include a relatively water-insoluble, water-impenetrable gum base in an amount ranging from about 8 to about 50%, and preferably from about 15 to about 40% by weight of the chewing gum composition.

In general, the gum base is prepared by heating and blending various ingredients, such as, natural gum, synthetic resins, waxes, plasticizers, etc., in a manner well known in the art. Typical examples of the ingredients found in a chewing gum base are masticatory substances of vegetable origin, such as chicle, crown gum, nispero rosidinha, jelutong, pendare, perillo, niger gutta, tunu, etc., masticatory substances of synthetic origin, such as butadiene-styrene polymer, isobutylene-isoprene copolymer, petroleum wax, polyethylene, polyisobutylene, polyvinylacetate, etc., plasticizers, such as lanolin, stearic acid, sodium stearate, potassium stearate, etc., antioxidants, such as butylated hydroxyanisole, butylated hydroxytoluene, and propyl gallate.

The water-insoluble gum base may consist of any of the various bases disclosed for example in U.S. Pat. Nos. 3,052,552 and 2,197,719. Typical ingredients included in gum base compositions are the following:

|  | Parts by Weight |
|---|---|
| Base I |  |
| Ester gum | 59 |
| Chalk | 30 |
| Rubber latex solids | 10 |
| Base II |  |
| Chicle | 20 |
| Jelutong | 40 |
| Chalk | 30 |
| Gutta soh | 9 |
| Base III |  |
| Partially oxidized chicle | 99 |
| Base IV |  |
| Jelutong (dry) | 80 |
| Gutta siak | 19 |

The chewing gum may also include flavoring, such as sour or fruit flavoring or non-acid or mint flavoring in an amount ranging from about 0.3 to about 2.0% by weight, and preferably from about 0.5 to about 1.2% by weight of the final gum product. The flavoring may comprise synthetic flavors and oils derived from plants, leaves, flowers, fruit, etc. Representative flavor oils of this type include acids such as adipic, succinic and fumaric acid, citrus oils such as lemon oil, orange oil, lime oil, grapefruit oil, fruit essences such as apple essence, pear essence, peach essence, strawberry essence, apricot essence, raspberry essence, cherry essence, plum essence, pineapple essence, as well as the following essential oils: peppermint oil, spearmint oil, mixtures of peppermint oil and spearmint oil, clove oil, bay oil, anise oil, eucalyptus oil, thyme oil, cedar leaf oil, cinnamon oil, or nutmeg, oil of sage, oil of bitter almonds, cassia oil, and methylsalicylate (oil of wintergreen).

The chewing gum of the invention may also contain softeners, chalk or non-chalk fillers and texturizers, such as hydrated alumina, plasticizers, emulsifiers, F.D.&C. coloring agents, and other conventional chewing gum additives as will be apparent to those skilled in the art.

The following Examples represent preferred embodiments of the present invention.

EXAMPLES 1 TO 4

Chewing gums of the compositions set out in Table I below are prepared in accordance with the method of the present invention.

TABLE I

| Ingredient | Parts by Weight | | | | |
|---|---|---|---|---|---|
|  | Example 1 | Example 2 | Example 3 | Example 4 | Control A |
| Gum Base | 22 | 22 | 22 | 22 | 22 |
| Sugar | 54 | 49 | 44 | 39 | 59 |
| Corn Syrup | 17 | 17 | 17 | 17 | 17 |

TABLE I-continued

| Ingredient | Parts by Weight | | | | |
|---|---|---|---|---|---|
| | Example 1 | Example 2 | Example 3 | Example 4 | Control A |
| Sorbitol | 5 | 10 | 15 | 20 | — |
| Lecithin | 0.2 | 0.2 | 0.2 | 0.2 | 0.2 |
| Flavor Oil (Spearmint) | 1.5 | 1 | 1 | 1 | 1 |
| Flavor, Spray Dried | 0.5 | 0.5 | 0.5 | 0.5 | 0.5 |
| Free Saccharin | 0.2 | 0.2 | 0.2 | 0.2 | 0.2 |

The gum base is added to a steam jacketed kettle equipped with a sigma blade mixer. The gum base is heated to about 200° F. to melt same. Thereafter, the melted gum base is colored to about 180° F. The corn syrup, lecithin and free saccharin acid are added to the gum base and mixed therewith for about 2 minutes. Flavor oil is then added and mixed therewith for about 3 minutes. The gum base mix is at this time in the form of a continuous mass.

The sugar is added to and mixed with the continuous mass for about 2½ minutes. Sorbitol is mixed for about 1½ minutes and then the spray dried flavor is mixed therewith for about 1 minute.

The mass is removed from the kettle, rolled, scored and cut into chewing gum sticks.

The chewing gum compositions of Examples 1 to 4 are tested for freshness or flexibility upon storage as described below. For purposes of comparison, Control A chewing gum composition as set out in Table I is prepared as described above except no sorbitol is present.

In addition, for purposes of comparison, commercial chewing gum, namely Wrigley's Doublemint (Control B), Wrigley's Spearmint (Control C), Life Savers' Peppermint (Control D), Life Savers' Spearmint (Control E), Wrigley's Big Red (Control F) and Beech-Nut Cinnamon (Control G) are tested for flexibility retention (that is, the ease at which chewing gum sticks may be bent).

In all cases, the tests for freshness or flexibility retention upon storage are carried out employing a Thwing-Albert Handle-O-Meter.

The Thwing-Albert Handle-O-Meter measures the force or weight in grams required to deflect a material to a predetermined distance. It is based on the movement of an edge at a controlled speed rate, forcing the test material to bend. Resistance to the movement of this edge is measured using a sensitive device. Thus, the more rigid is the test material, the greater the force required.

Using this instrument a chewing gum stick is placed under the edge and on the sample table. When the instrument is activated, the edge moves at a controlled rate, forcing the chewing gum to bend. The resistance is transferred to a meter calibrated in grams. This technique is used for all evaluations.

Experiments have also shown that flexibility is dependent on the relative humidity during storage. Accordingly, samples for evaluation are stored under controlled temperature and relative humidity conditions. The storage regimen is as follows:

(a) in packages (wrapped) at 50% relative humidity (RH)
(b) exposed (no wrapper) at 50% RH
(c) exposed (no wrapper) at 65% RH Samples are evaluated at zero time and weekly thereafter for a period of four weeks of storage.

A sample of 5 sticks is withdrawn from storage once every week. Each stick is tested with the Handle-O-Meter. Average Handle-O-Meter values (grams) are summarized in Tables II and III.

TABLE II

AVERAGE HANDLE-O-METER VALUES (GRAMS) OF CHEWING GUMS STORED AT 70° F. AND 50% AND 65% RELATIVE HUMIDITIES

| Time (Weeks) | Example 1 | | | Example 2 | | |
|---|---|---|---|---|---|---|
| | W[1] | 50% R.H.[2] | 65% R.H.[3] | W[1] | 50% R.H.[2] | 55% R.H.[3] |
| 0 | — | 31.0 | — | — | 29.6 | — |
| 1 | 34.6 | 81.0 | 18.4 | 33.6 | 75.4 | 20.8 |
| 2 | 38.0 | 110.2 | 18.6 | 35.6 | 96.0 | 17.4 |
| 3 | 36.2 | 131.0 | 17.0 | 30.0 | 95.6 | 17.2 |
| 4 | 40.0 | 131.0 | 18.0 | 30.2 | 107.8 | 18.4 |
| | Example 3 | | | Example 4 | | |
| 0 | — | 34.6 | — | — | 34.7 | — |
| 1 | 42.4 | 70.4 | 26.4 | 33.4 | 74.6 | 21.2 |
| 2 | 43.4 | 97.8 | 23.6 | 40.6 | 101.0 | 20.8 |
| 3 | 43.4 | 115.2 | 20.4 | 36.4 | 106.2 | 19.6 |
| 4 | 36.8 | 114.2 | 20.0 | 36.4 | 114.6 | 17.4 |

[1]Stored at 70° F. and 50% R.H. in original wrappers
[2]Stored at 70° F. and 50% R.H. with no wrappers
[3]Stored at 70° F. and 65% R.H. with no wrappers

TABLE III

AVERAGE HANDLE-O-METER VALUES (GRAMS) OF CONTROL GUMS STORED AT 70° F. AND 50% AND 65% RELATIVE HUMIDITIES

| Time (Weeks) | Control A | | |
|---|---|---|---|
| | W[1] | 50% R.H.[2] | 65% R.H.[3] |

TABLE III-continued
AVERAGE HANDLE-O-METER VALUES (GRAMS) OF CONTROL GUMS
STORED AT 70° F. AND 50% AND 65% RELATIVE HUMIDITIES

| | | | |
|---|---|---|---|
| 0 | — | 41.0 | — |
| 1 | 48.6 | 130.0 | 21.8 |
| 2 | 59.4 | 210.0* | 20.4 |
| 3 | 68.0 | 210.0* | 21.6 |
| 4 | 63.2 | 250.0* | 23.6 |

| | Control B Wrigley's Doublemint | | | | Control C Wrigley's Spearmint | | |
|---|---|---|---|---|---|---|---|
| 0 | — | 38.3 | — | — | 56.4 | — |
| 1 | 63.8 | 95.4 | 20.8 | 92.0 | 135.0 | 35.6 |
| 2 | 71.1 | 145.0 | 17.2 | 89.1 | 155.0 | 34.4 |
| 3 | 62.1 | 175.0* | 16.4 | 83.8 | 175.0* | 31.4 |
| 4 | 67.4 | 210.0* | 20.8 | 90.6 | 210.0* | 33.0 |

| | Control D Life Savers Peppermint | | | Control E Life Savers Spearmint | | |
|---|---|---|---|---|---|---|
| Time (Weeks) | W[1] | 50% R.H.[2] | 65% R.H.[3] | W[1] | 50% R.H.[2] | 65% R.H.[3] |
| 0 | — | 28.0 | — | — | 24.5 | — |
| 1 | 48.8 | 127.0 | 22.2 | 43.7 | 93.0 | 24.2 |
| 2 | 66.4 | 155.0 | 19.7 | 45.6 | 136.2 | 22.8 |
| 3 | 69.2 | 175.0* | 18.4 | 43.1 | 165.0* | 19.6 |
| 4 | 98.5 | 205.0* | 26.4 | 49.6 | 190.0* | 21.0 |

| | Control F Wrigley's Big Red | | | Control G Beech-Nut (Cinnamon) | | |
|---|---|---|---|---|---|---|
| 0 | — | 94.2 | — | — | 49.2 | — |
| 1 | 87.0 | 175.0 | 24.4 | 47.6 | 134.6 | 30.8 |
| 2 | 103.6 | 210.0* | 17.2 | 53.0 | 175.0* | 31.0 |
| 3 | 121.0 | 225.0* | 21.8 | 57.6 | 210.0* | 30.0 |
| 4 | 126.8 | 250.0* | 23.8 | 74.0 | 225.0* | 29.8 |

[1]Stored at 70° F. and 50% R.H. in original wrappers
[2]Stored at 70° F. and 50% R.H. with no wrappers
[3]Stored at 70° F. and 65% R.H. with no wrappers
*Brittle, broke during testing In order to assure that the Examples 1 to 4 and Control A samples are of the same production dates, these samples are manufactured at approximately the same dates and introduced into storage at approximately the same time.

As shown in Tables II and III, the less force (in grams) required to bend the stick of gum, the greater the flexibility of the gum.

Data indicate that Control A, which contains no sorbitol, is brittle after one week of storage at 70° F. and 50% relative humidity with no wrappers. In comparison, the Examples 1 to 4 samples containing sorbitol, stored under the same conditions, show no brittleness or cracking during testing even after four weeks of storage.

Comparison between Examples 1 to 4 and Control A indicates that there is a signficant difference (at the 99% confidence level) between Control A and the other samples; the latter showing more flexibility as indicated by the lower Handle-O-Meter values. In addition, data also suggest that the optimum level of sorbitol concentration is between 10 and 20 percent, although no significant differences are observed between these samples and the one containing 20 percent sorbitol.

Average Handle-O-Meter values (grams) of spearmint and peppermint commercial gums (Controls B to E) and cinnamon gums (Controls F and G) are summarized in Table III.

These data indicate that commercial gums stored at 70° F. and 50% relative humidity with no wrappers exhibit breakage when tested with the Handle-O-Meter after two weeks of storage. In comparison, the Examples 1 to 4 gums are still flexible after 4 weeks of storage under the same conditions. There is a significant difference (at the 99% confidence level) between values obtained for the Control gums and the gums of the inventions at all storage times and under all storage conditions tested.

Data also seems to indicate that the flexibility retention is an inherent property of the gum, apparently related to the equilibrium relative humidity. This is based on the relatively minor increase in the flexibility of the gums of the invention (decrease in Handle-O-Meter values) as compared to the significant increase in the flexibility of the Control gums.

Although the Control gums B to G may be from 1 to 3 months older than the Examples 1 to 4 gums when tested, results similar to that shown in Tables II and III are obtained when all of the gums tested are produced on essentially the same dates.

EXAMPLES 5 TO 7

Chewing gums of the compositions set out in Table IV below are prepared in accordance with the method of the present invention.

TABLE IV

| | Parts by Weight | | | |
|---|---|---|---|---|
| Ingredient | Example 5 | Example 6 | Example 7 | Control H |
| Gum Base | 22 | 22 | 22 | 22 |
| Sugar | 59 | 49 | 59 | 59 |
| Corn Syrup | 17 | 17 | 17 | 17 |
| Sorbitol | 10 | 20 | — | — |
| Lecithin | 0.2 | 0.2 | 0.2 | 0.2 |
| Flavor Oil (Peppermint) | 1 | 1 | 1 | 1 |
| Flavor, Spray Dried | 0.5 | 0.5 | 0.5 | 0.5 |
| Xylitol | — | — | 10.0 | — |

The gum base is added to a steam jacketed kettle equipped with a sigma blade mixer. The gum base is heated to about 200° F. to melt same. Thereafter, the melted gum base is cooled to about 180° F. The corn syrup and lecithin are added to the gum base and mixed therewith for about 2 minutes. Flavor oil is then added and mixed therewith for about 3 minutes. The gum base mix is at this time in the form of a continuous mass.

The sugar is added to and mixed with the continuous mass for about 2½ minutes. Sorbitol is mixed for about 1½ minutes and then the spray dried flavor is mixed therewith for about 1 minute. In the case of Example 7, xylitol is used in place of sorbitol.

The mass is removed from the kettle, rolled, scored and cut into chewing gum sticks.

The chewing gum compositions of Examples 5 to 7 are tested for freshness or flexibility upon storage as described hereinbefore using the Thwing-Albert Handle-O-Meter. For purposes of comparison, Control H chewing gum composition as set out in Table IV is prepared as described above except no sorbitol or xylitol is present and the gum base does not contain chalk. The test results obtained are set out in Table V below.

TABLE VI

| Ingredient | Parts by Weight | |
|---|---|---|
| | Example 8 | Control I |
| Gum Base | 22 | 22 |
| Sugar | 50 | 50 |
| Corn Syrup | 17 | 17 |
| Sorbitol | 10 | 10 |
| Lecithin | 0.2 | 0.2 |
| Flavor | 1 | 1 |
| Free Saccharin | 0.2 | 0.2 |

The Example 8 formulation is prepared as follows.

The gum base is added to a steam jacketed kettle equipped with a sigma blade mixer. The gum base is heated to about 200° F. to melt same. Thereafter, the melted gum base is cooled to about 180° F. The corn syrup, lecithin and free saccharin acid are added to the gum base and mixed therewith for about 2 minutes. The gum base mix is at this time in the form of a continuous mass.

The sugar is added to and mixed with the continuous mass for about 2½ minutes. Sorbitol is mixed for about 1½ minutes and then the flavor is mixed therewith for about 1 minute.

TABLE V

AVERAGE HANDLE-O-METER VALUES (GRAMS) OF CHEWING GUMS OF INVENTION STORED AT 70° F. and 50% AND 65% RELATIVE HUMIDITIES

| Tie (Weeks) | Example 5 | | | Example 6 | | |
|---|---|---|---|---|---|---|
| | W[1] | 50% R.H.[2] | 65% R.H.[3] | W[1] | 50% R.H.[2] | 65% R.H.[3] |
| 0 | — | 23.4 | — | — | 29.2 | — |
| 1 | 27.0 | 90.8 | 8.0 | 33.0 | 88.2 | 12.4 |
| 2 | 29.8 | 125.0 | 5.5 | 37.2 | 124.6 | 7.2 |
| 3 | 22.4 | 130.8 | 4.4 | 26.6 | 126.2 | 4.2 |
| 4 | 24.4 | * | 3.2 | 41.2 | 143.8 | 3.4 |
| 5 | 24.6 | * | 3.0 | 34.4 | 123.8 | 3.0 |
| | Example 7 | | | Control H | | |
| 0 | — | 27.4 | — | — | 49.8 | — |
| 1 | 25.4 | 78.5 | 6.0 | 42.6 | 108.0 | 17.8 |
| 2 | 28.8 | 121.8 | 4.2 | 47.0 | 149.0 | 16.0 |
| 3 | 32.6 | 115.6 | 4.4 | 43.6 | 190.0* | 8.4 |
| 4 | 29.6 | * | 3.8 | 44.8 | * | 6.6 |
| 5 | 35.4 | 117.8 | 5.4 | 41.8 | * | 6.6 |

[1]Stored at 70° F. and 50% R.H. in original wrappers
[2]Stored at 70° F. and 50% R.H. with no wrappers
[3]Stored at 70° F. and 65% R.H. with no wrappers
*brittle, broke during testing In order to assure that the Examples 5 to 7 and Control H samples are of the same production dates, these samples are manufactured at approximately the same dates and introduced into storage at approximately the same time.

As shown in Table V, the less force (in grams) required to bend the stick of gum, the greater the flexibility of the gum.

Data indicated that Control H, which contains no xylitol or sorbitol, is brittle after 2-3 weeks of storage at 70° F. and 50% relative humidity with no wrappers. In comparison, the Examples 5 to 7 samples containing sorbitol or xylitol, stored under the same conditions, show no brittleness or cracking during testing even after four weeks of storage.

EXAMPLE 8

Chewing gums of the compositions set out in Table VI below are prepared in accordance with the method of the present invention.

The mass is removed from the kettle, rolled, scored and cut into chewing gum sticks. A group of five sticks are wrapped in tin foil and dipped into paraffin wax to prevent moisture loss.

The Control I formulation is prepared as described above except that the sorbitol is added before the sugar.

The chewing gum compositions of Example 8 and Control I are tested for sweat resistance upon storage at 100° F. for 72 hours. After 72 hours of storage, it is seen that the Control I sticks block (stick together) indicating severe sweating (moisture at the surface), while the Example 8 sticks are easily separated indicating no sweat problem and good sweat resistance.

What is claimed is:

1. In a method for improving flexibility retention while maintaining sweat resistance of chewing gum prepared by mixing gum base, aqueous softener, sucrose, and a solid sorbitol humectant, the improvement which comprises substantially isolating said aqueous softener from said humectant in said chewing gum and minimizing the amount of surface aqueous softener by incorporating said aqueous softener in said gum base to form a water-insoluble phase, admixing said sucrose with said water-insoluble phase, and lastly admixing from about 2 to about 50% by weight of said solid sorbitol humectant with said sucrose water-insoluble phase combination to form a chewing gum wherein said humectant is provided in a water-soluble phase which is substantially isolated from said aqueous softener in said water-insoluble phase.

2. The method as defined in claim 1 wherein said aqueous softener comprises a syrup substance selected from the group consisting of corn syrup of varying Dextrose Equivalents and Baumés and reducing sugar compositions.

3. The method as defined in claim 1 wherein said sorbitol is present in an amount within the range of from about 2 to about 20% by weight of the finished chewing gum.

4. The method as defined in claim 3 wherein said sorbitol is present in an amount ranging from about 10 to about 20% by weight of the finished chewing gum.

5. The method as defined in claim 1 further including the step of adding flavor oil to the gum base prior to adding sucrose thereto.

* * * * *

UNITED STATES PATENT AND TRADEMARK OFFICE
CERTIFICATE OF CORRECTION

PATENT NO. : 4,166,134
DATED : August 28, 1979
INVENTOR(S) : Frank Witzel et al.

It is certified that error appears in the above-identified patent and that said Letters Patent are hereby corrected as shown below:

Column 2, line 4, "water-oil" should read --water-in-oil--.
Column 4, line 46, "or nutmeg" should read --oil of nutmeg--.
Column 9, Table V, in the heading of the first column, "Tie (Weeks)" should read --Time (Weeks)--.

Signed and Sealed this

Eighteenth Day of December 1979

[SEAL]

*Attest:*

SIDNEY A. DIAMOND

*Attesting Officer*      *Commissioner of Patents and Trademarks*